United States Patent [19]

Kato

[11] Patent Number: 5,218,550
[45] Date of Patent: Jun. 8, 1993

[54] APPARATUS FOR ALIGNING A ROBOT AND A PROCESSING MACHINE

[75] Inventor: Hisao Kato, Aichi, Japan
[73] Assignee: Mitsubishi Denki K.K., Tokyo, Japan
[21] Appl. No.: 146,549
[22] Filed: Jan. 21, 1988

[30] Foreign Application Priority Data

Jan. 21, 1987 [JP] Japan .................................. 62-11683

[51] Int. Cl.⁵ ............................................. G06F 15/46
[52] U.S. Cl. .............................. 364/474.34; 364/559; 395/89; 901/50
[58] Field of Search ............. 364/513, 474.34, 474.35, 364/478, 474.02, 571.01, 559; 901/3, 31, 9, 16, 41, 6, 7; 33/172 D, 642; 414/730, 744 A, 744 R, 749, 750, 751; 82/124; 29/568

[56] References Cited

U.S. PATENT DOCUMENTS

| | | | |
|---|---|---|---|
| 4,372,721 | 2/1983 | Harjar et al. | 364/513 |
| 4,479,754 | 10/1984 | Inaba et al. | 901/31 |
| 4,481,592 | 11/1984 | Jacobs et al. | 364/191 |
| 4,541,062 | 9/1985 | Kada | 901/6 |
| 4,576,537 | 3/1986 | Inaba et al. | 901/7 |
| 4,628,778 | 12/1986 | Nakashima et al. | 82/124 |
| 4,702,665 | 10/1987 | Nakashima et al. | 414/730 |
| 4,762,459 | 8/1988 | Morita et al. | 901/22 |
| 4,782,567 | 11/1988 | Kanaya et al. | 901/7 |
| 4,831,547 | 5/1989 | Ishiguru | 901/6 |

FOREIGN PATENT DOCUMENTS

52-75761  6/1977  Japan ...................................... 901/6

Primary Examiner—Joseph Ruggiero
Attorney, Agent, or Firm—Sughrue, Mion, Zinn Macpeak & Seas

[57] ABSTRACT

An industrial robot device in which accurate alignment between the robot and the processing machine with which it is employed are ensured. Alignment datum points are provided both on a standard mounting face of the robot, which preferably corresponds to the X axis assumed by the robot-operating software, and on a standard mounting face of the processing machine, which corresponds to the X axis of the latter. The robot is mounted to the processing machine in such a manner that the two datum points are aligned.

9 Claims, 2 Drawing Sheets

APPARATUS FOR ALIGNING A ROBOT AND A PROCESSING MACHINE

BACKGROUND OF THE INVENTION

The present invention relates to an industrial robot device, and in particular to the mounting of a robot to a processing machine with which the robot is to be employed.

In conventional robot systems absolute X and Y axes assumed by the software used for driving the robot are set in fixed directions with respect to the robot body. To ensure effective MDI operations, the robot should be mounted to the lathe or other processing machine with which it is employed in such a manner that the X and Y axes of the machine and the X and Y axes assumed by the software are accurately aligned. (See, for example, Japanese Laid-Open Patent Application No. 1980-21362). (MDI operations involve entering the values for the directions of the X and Y axes with respect to the robot, and the X and Y dimensions, and moving the robot to the required positions).

However, it is generally the case that the direction of the X and Y axes of the software are not indicated on the body of the robot. Moreover, the boltholes provided for attaching the robot to the attachment base of the lathe or the like allow a certain degree of slack, and hence it is not always the case that the X and Y axes of the software and the X and Y axes of the processing machine are correctly aligned with each other. When there occurs such misalignment of the X and Y axes of the robot software and the X and Y axes of the processing machine, the movements of the robot may interfere with the processing machine, and thus there is the danger of damage to either or both of these assemblies.

SUMMARY OF THE INVENTION

The present invention is intended to alleviate the above problems, and has the object of providing an industrial robot device in which the X and Y axes of the robot software are accurately aligned with the X and Y axes of the processing machine.

In accordance with the above and other objects, the industrial robot device of the present invention provides a mounting datum point having a specific relation to the absolute X and Y axes of the software on a part of the robot, and a mounting datum point corresponding to the robot mounting datum point on a part of the processing machine to which said robot is to be attached.

In accordance with the invention, the standard mounting face of the robot base is aligned with the standard attachment face of the robot attachment base extending parallel to the X and Y axes of the processing machine, and the datum point of the standard mounting face is aligned with the datum point of the standard attachment face, the standard mounting base being mounted on a mounting base extending parallel to the mounting base of the processing machine, thus ensuring accurate alignment of the X and Y axes of the robot software with the X and Y axes of the processing machine.

DESCRIPTION OF THE PREFERRED EMBODIMENTS

Preferred embodiments of the invention will now be explained with reference to the drawings.

Figure 1:
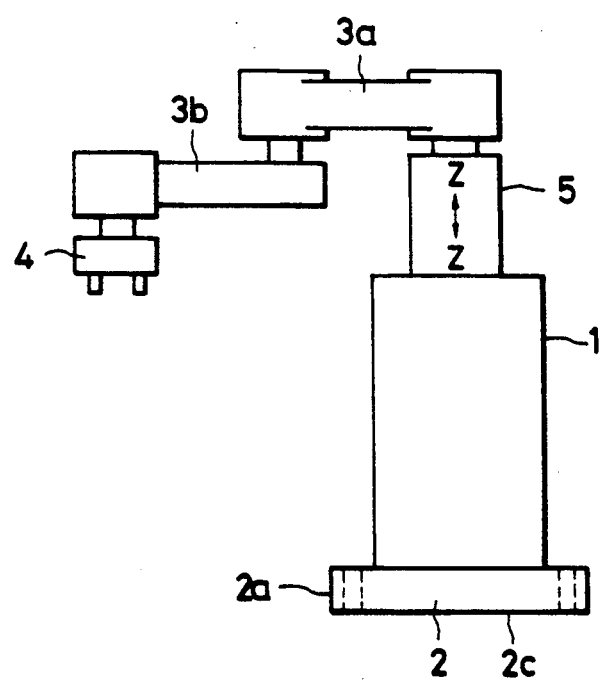
FIGS. 1 and 2 are a side view and a plan view, respectively, of an industrial robot of the present invention.
Figure 2:
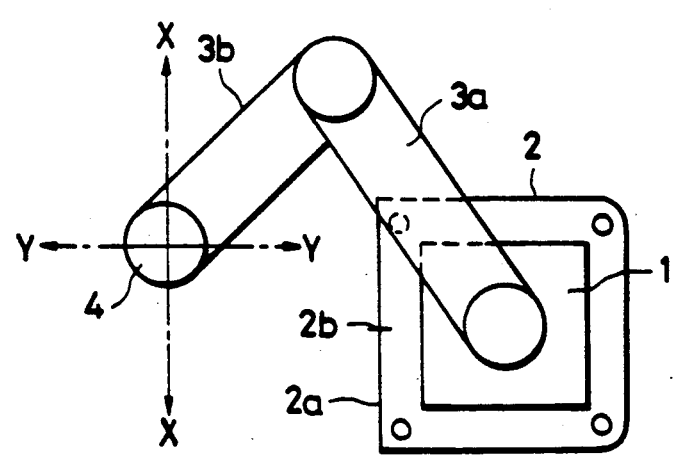

FIGS. 1 and 2 are, respectively, a side view and a plan view of a robot. In these figures, reference numeral 1 indicates a robot body having a base 2, and 3a and 3b are arms which terminate in a hand 4. These members are moved up and down freely by means of a piston 5, and the arms 3a and 3b are moved freely in the horizontal plane by means of a drive mechanism at either end. Furthermore, the robot hand 4 can be moved along the absolute X axis of the software and a Y axis at right angles to this X axis.

At the front face of the base 2 of the robot 1 are formed a standard mounting face 2a extending parallel to the absolute X axis of the robot software, a datum point 2b being placed on the standard mounting face 2a which is the zero point for the X axis, and a standard mounting base 2c extending perpendicular to the vertical motion of the robot piston 5, namely, in a Z-axis direction.

Figure 3:
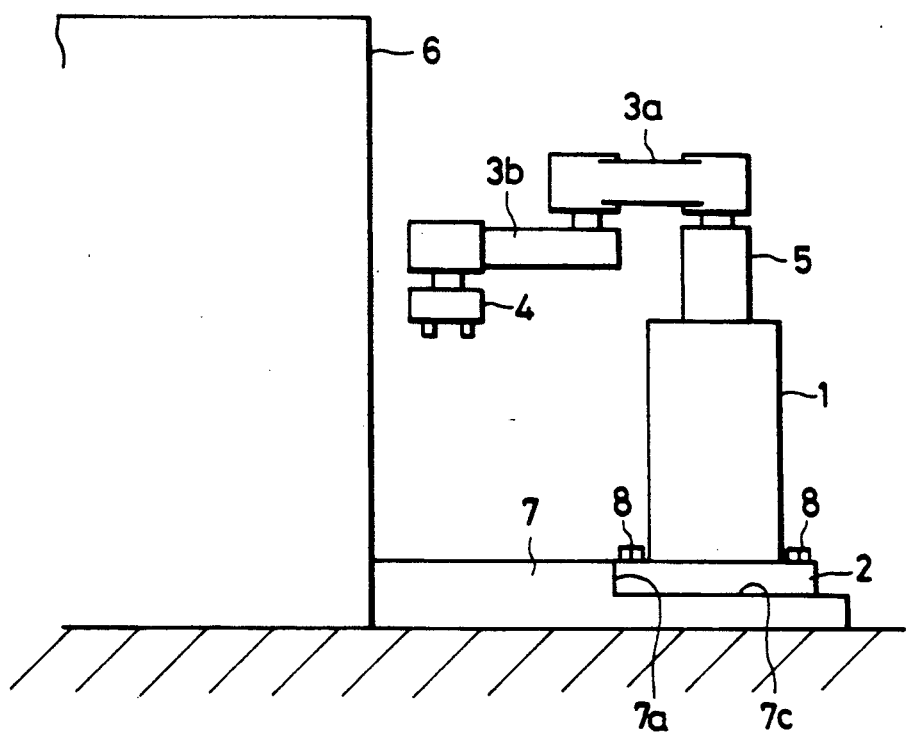
FIGS. 3 and 4 show a side view and a plan view, respectively, of the robot as attached to the processing machine.
Figure 4:
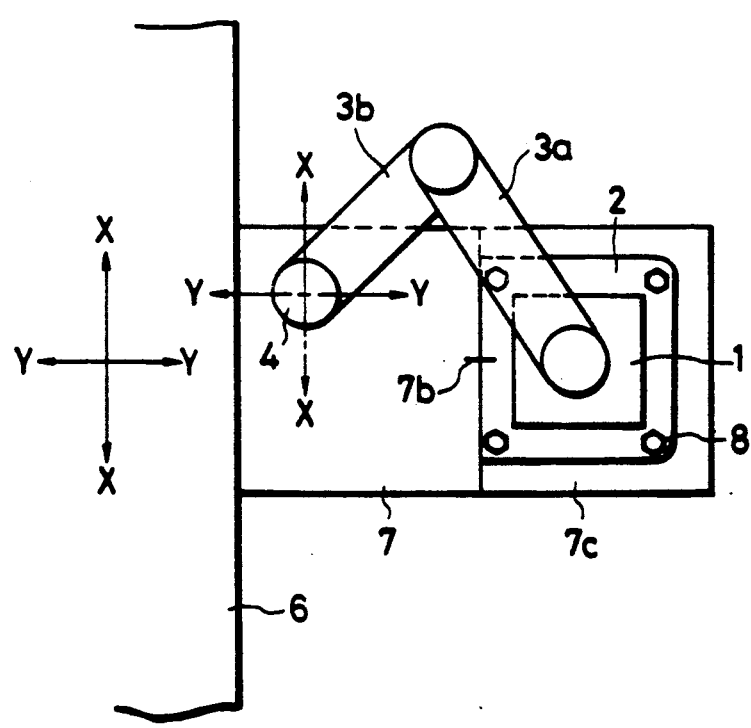

FIGS. 3 and 4 show respectively a side view and a plan view of the robot as mounted, reference numeral 6 indicating a lathe or other processing machine to which the robot is attached and 7 the attachment base for the robot. Reference numeral 7a indicates a standard attachment face extending parallel to the X axis of the processing machine 6, 7b a datum point which is the zero point for this X axis, and 7c a mounting base that extends parallel to the mounting base of the processing machine 6.

The inventive industrial robot device constituted as described above is mounted by placing the base 2 of the robot body 1 on the mounting base 7c while ensuring that the standard mounting face 2a of the base 2 abuts against the standard attachment face 7a of the attachment base 7, and that the datum point 2b of the base 2 is aligned with the datum point 7b of the attachment base 7, with the two assemblies being secured by bolts 8. This ensures that the X and Y axes of the robot software are accurately aligned with the X and Y axes of the processing machine, and hence that MDI operations can be accurately carried out.

In the above embodiment, the standard mounting points for the robot base have been described with reference to the X axis of the software, but they may equally well be aligned with the Y axis of the software, or at a specific angle to the X and Y axes. In any of these cases, it is sufficient that accurate mounting datum points be provided with respect to the X and Y axes of the software.

The attached drawings illustrate a horizontally mounted robot, but the invention can be applied in the same way to a vertically mounted robot or a robot operating with cylindrical co-ordinates.

As described above, by providing a mounting datum point having a specific relation to the absolute X and Y axes of the robot-operating software on a part of the robot, and also a mounting datum point corresponding to the robot mounting datum point on a part of the processing machine, accurate alignment of the X and Y axes of the robot software with the X and Y axes of the processing machine is ensured, and, as a result, effective and accurate MDI operations can be performed. Thus, the use of the invention is effective in preventing damage caused by interference between movement carried by the robot hand and the processing machine due to misalignment of the robot and processing machine, as has heretofore been the case. In addition, the mounting of the robot can be carried out very easily.

What is claimed is:

1. A robot device, comprising:

a robot having a first reference base surface and a first reference side surface, said first reference side surface comprising a standard mounting face of said robot, with a first reference point being marked on said first reference side surface;

means for operating said robot using coordinate positions defined using at least two axes;

a processing machine having a second reference base surface and a second reference side surface, said second reference side surface comprising a standard mounting face of said processing machine, with a second reference point being marked on said second reference side surface;

said first reference point being provided at a point on said first reference side surface which corresponds to a predetermined one of said coordinate positions and which is aligned with a predetermined one of said axes;

said second reference point being provided at a point on said second reference side surface which corresponds to said predetermined one of said coordinate positions and which is aligned with said predetermined one of said axes; and fixing means for fixedly attaching said robot and said processing machine with said first and second reference base surfaces abutting one another and said first and second reference side surfaces abutting one another while said first and second reference points are aligned, said fixing means comprising coupling means for coupling said robot to said processing machine with a degree of slack which permits said robot and said processing machined to be coupled to one another over a range of coupling positions which includes a desired relative position at which said first and second reference points are aligned as well as other relative positions at which said first and second reference points are not aligned, which coupling means is tightenable to hold said robot and processing machine at said desired relative position after said first and second reference points have been aligned, with said first and second reference points being visible after said coupling means is tightened with said first and second reference side surfaces abutting one another.

2. The robot device of claim 1, wherein said coordinate positions are determined using cylindrical coordinates.

3. The robot device of claim 1, wherein said fixing means comprises one or more bolts.

4. The robot device of claim 1, wherein said processing machine is a lathe.

5. The robot device of claim 1, wherein said means for operating said robot comprises software.

6. A robot device, comprising:

a robot having first and second reference surfaces, with a first reference point being marked on said second reference surface;

means for controlling movement of said robot with respect to at least one axis, said first reference point being marked at a predetermined position which is aligned with said at least one axis;

a processing machine to which said robot is fixedly attached, said processing machine having a processing machine reference surface with a second reference point marked thereon which is aligned with said at least one axis and is aligned with said first reference point when said robot is attached to said machine; and fixing means for fixedly securing said robot to said processing machine with said first reference surface and said processing machine reference surface abutting one another, said fixing means comprising coupling means for coupling said robot to said processing machine with a degree of slack which permits said robot and said processing machine to be coupled to one another over a range of coupling positions which includes a desired relative position at which said first and second reference points are aligned as well as other relative positions at which said first and second reference points are not aligned, which coupling means is tightenable to hold said robot and processing machine at said desired relative position after said first and second reference points have been aligned, with said first and second reference points being visible after said coupling means is tightened with said first reference surface and processing machine reference surface abutting one another.

7. A robot device, comprising:

a robot having a first reference base surface (2c) and a first reference side surface (2a), with a with a first reference point (2b) being marked on said first reference side surface;

a processing machine for controlling movement of said robot with respect to at least two axes, said processing machine having a second reference base surface (7c) extending parallel to said first reference base surface and having a second reference side surface (7a) on which a second reference point (7b) is marked, said first and second reference points being aligned with one of said two axes said processing machine being mounted with said first reference base surface in contact with said second reference base surface with said second reference side surface in contact with said first reference side surface; and fixing means for fixedly securing said robot to said processing machine with said first and second reference base surfaces abutting one another and said first and second reference side surfaces abutting one another while said first and second reference points are aligned, said fixing means comprising coupling means for coupling said robot to said processing machine with a degree of slack which permits said robot and said processing machine to be coupled to one another over a range of coupling positions which includes a desired relative position at which said first and second reference points are aligned as well as other relative positions at which said first and second reference points are not aligned, which coupling means is tightenable to hold said robot and processing machine at said desired relative position after said first and second reference points have been aligned, with said first and second reference points being visible after said coupling means is tightened with said first and second reference side surfaces abutting one another.

8. A robot device, comprising:
a robot;
means for operating said robot using coordinate positions defined relative to at least two axes;
a processing machine;
a first reference point provided at a point on said robot which corresponds to a predetermined one of said coordinate positions aligned with one of said axes;
a second reference point provided at a point on said processing machine which corresponds to said predetermined one of said coordinate positions; and
fixing means for fixedly securing said robot to said processing machine with said first and second reference points are aligned, said fixing means comprising coupling means for coupling said robot to said processing machine with a degree of slack which permits said robot and said processing machine to be coupled to one another over a range of coupling positions which includes a desired relative position at which said first and second reference points are aligned as well as other relative positions at which said first and second reference points are not aligned, which coupling means is tightenable to hold said robot and processing machine at said desired relative position after said first and second reference points have been aligned with said first and second reference points being visible after said coupling means is tightened.

9. A robot device, comprising:
a robot having at least first and second reference surfaces (2a, 2c);
means for operating said robot using coordinate positions relative to first, second and third coordinate axes;
a processing machine having at least first and second reference surfaces (7a, 7c);
a first reference point (2b) provided at a point on said robot which corresponds to a predetermined one of said coordinate positions aligned with said first coordinate axis, said first reference point being visible from a third surface of said robot when said first and second reference surfaces of said robot are in contact with said first and second reference surfaces of said processing machine;
a second reference point (7b) provided at a point on said processing machine which corresponds to said predetermined one of said coordinate positions aligned with said first coordinate axis, said second reference point being visible from a third surface of said processing machine when said first and second reference surfaces of said robot are in contact with said first and second reference surfaces of said processing machine; and
fixing means for fixedly securing said robot to said processing machine with said first and second reference surfaces of said robot abutting said first and second reference surfaces, respectively, of said processing machine to position said robot and processing means relative to said second and third coordinate axes, and with said first and second reference points being visible and aligned to position said robot and processing means relative to said first coordinate axis.

* * * * *